(12) United States Patent
Hirth et al.

(10) Patent No.: US 12,234,760 B2
(45) Date of Patent: Feb. 25, 2025

(54) DEVICE OF EXHAUST GAS TREATMENT AND METHOD FOR PRODUCTION THEREOF

(71) Applicant: Vitesco Technologies GmbH, Regensburg (DE)

(72) Inventors: Peter Hirth, Munich (DE); Rolf Brück, Munich (DE); Holger Stock, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 33 days.

(21) Appl. No.: 17/783,524

(22) PCT Filed: Dec. 8, 2020

(86) PCT No.: PCT/EP2020/085055
§ 371 (c)(1),
(2) Date: Jun. 8, 2022

(87) PCT Pub. No.: WO2021/116095
PCT Pub. Date: Jun. 17, 2021

(65) Prior Publication Data
US 2023/0349310 A1 Nov. 2, 2023

(30) Foreign Application Priority Data
Dec. 9, 2019 (DE) ...................... 10 2019 219 150.9

(51) Int. Cl.
*F01N 3/20* (2006.01)
*F01N 3/28* (2006.01)

(52) U.S. Cl.
CPC ......... *F01N 3/2026* (2013.01); *F01N 3/2828* (2013.01); *F01N 2240/16* (2013.01); *F01N 2330/04* (2013.01)

(58) Field of Classification Search
CPC .. F01N 3/2026; F01N 3/2828; F01N 2240/16; F01N 2330/04
See application file for complete search history.

(56) References Cited

U.S. PATENT DOCUMENTS 4,456,457 A * 6/1984 Nozawa .................. F01N 3/027
55/482
4,516,993 A * 5/1985 Takeuchi ............... B01D 46/84
60/303

(Continued)

FOREIGN PATENT DOCUMENTS

DE 199 24 861 10/2000
DE 10 2008 039 589 4/2009

(Continued)

OTHER PUBLICATIONS

International Search PCT/EP2020/085055.

(Continued)

*Primary Examiner* — Jesse S Bogue
(74) *Attorney, Agent, or Firm* — COZEN O'CONNOR

(57) ABSTRACT

In a device for the aftertreatment of exhaust gases from an emission source, in particular an internal combustion engine, with an exhaust tract through which an exhaust gas can flow in a direction of flow, with at least one catalytic converter, the catalytic converter having a ceramic honeycomb body has: a catalytically active surface coating, and with an electrically heatable heater, the heater having a metallic electrical conductor, the honeycomb body further having a plurality of flow channels which can be flowed through from a gas inlet side to a gas outlet side, wherein the conductor is integrated in the ceramic honeycomb body, and is arranged downstream of the gas inlet side and upstream of the gas outlet side, as viewed in the direction of flow.

14 Claims, 3 Drawing Sheets

(56) References Cited

U.S. PATENT DOCUMENTS

| | | | |
|---|---|---|---|
| 5,140,813 A * | 8/1992 | Whittenberger | B01J 35/33 60/299 |
| 5,254,840 A * | 10/1993 | Thompson | F01N 3/027 428/116 |
| 5,433,926 A | 7/1995 | Swars | |
| 5,582,805 A * | 12/1996 | Yoshizaki | F01N 13/009 422/174 |
| 5,584,175 A * | 12/1996 | Carlborg | B01J 35/0033 422/177 |
| 8,409,516 B2 * | 4/2013 | Kim | F01N 13/017 422/177 |
| 10,143,967 B2 * | 12/2018 | Crawford | H05B 6/108 |
| 11,668,215 B2 * | 6/2023 | Akyildiz | F01N 3/035 422/177 |
| 2006/0204408 A1 * | 9/2006 | Son | B01D 53/885 422/177 |
| 2008/0307775 A1 * | 12/2008 | Gonze | F01N 3/027 60/303 |
| 2011/0158870 A1 | 6/2011 | Hodgson et al. | |
| 2015/0267583 A1 | 9/2015 | Brueck et al. | |
| 2017/0218817 A1 | 8/2017 | Mengelberg | |
| 2021/0324772 A1 * | 10/2021 | Miyairi | F01N 3/28 |

FOREIGN PATENT DOCUMENTS

| | | |
|---|---|---|
| DE | 102008039589 B4 | 5/2013 |
| DE | 10 2012 109 391 | 4/2014 |
| DE | 10 2014 115 063 | 4/2016 |
| EP | 0 569 109 | 11/1993 |
| JP | S54-155191 | 12/1979 |
| JP | H 0559939 | 3/1993 |
| JP | H05-069318 U | 9/1993 |
| JP | H05-509037 | 12/1993 |
| JP | H0-639294 | 2/1994 |
| JP | H 07-22160 | 1/1995 |
| JP | H08-12460 | 1/1996 |
| JP | H11-072017 | 3/1999 |
| JP | 2007-051033 | 3/2007 |
| JP | 2015-535796 | 12/2015 |
| JP | 2018-202278 | 12/2018 |
| KR | 10-1241721 B1 | 3/2013 |
| WO | 8910471 | 11/1989 |
| WO | WO 92/13636 | 8/1992 |

OTHER PUBLICATIONS

Written Opinion issued in corresponding PCT Application PCT/EP2020/085055.
Office Action issued in corresponding German Application No. 10 2019 219 150.9.
Office Action dated Jun. 5, 2023 issued in European Patent Application No. 20821192.0.
Office Action Jul. 28, 2023 issued in Japanese Patent Application No. 2022-534748.
Office Action dated Aug. 17, 2023 issued in Chinese Patent Application No. 202080085701.3.
Office dated Jan. 12, 2024 issued in Korean Patent Application No. 10-2022-7023298.
Office Action dated Feb. 5, 2024 issued in Chinese Patent Application No. 202080085701.3.

* cited by examiner

DEVICE OF EXHAUST GAS TREATMENT AND METHOD FOR PRODUCTION THEREOF

CROSS REFERENCE TO RELATED APPLICATIONS

This is a U.S. national stage of International application No. PCT/EP2020/085055, filed on Dec. 8, 2020, which claims priority to German Application No. 10 2019 219 150.9 filed Dec. 9, 2019, the content of each of which is incorporated herein by reference.

BACKGROUND OF THE INVENTION

1. Field of the Invention

The invention relates to a device for the aftertreatment of exhaust gases from an emission source, in particular an internal combustion engine. Furthermore, the invention relates to a method for producing a honeycomb body.

2. Description of the Prior Art

In order to increase the exhaust gas temperature, electrical heaters are used in the exhaust tract of internal combustion engines in order to reach the minimum temperature required for exhaust gas aftertreatment more quickly. In this way, an attempt is made to reach more quickly the so-called light-off temperature, from which the catalytic converters used allow adequate exhaust gas aftertreatment. This is particularly advantageous when starting the internal combustion engine from cold. With regard to hybrid vehicles, such a cold start may occur with a higher rate of recurrence, which is why electrical auxiliary heating is necessary.

The catalytic converters used in the exhaust system have either a metallic matrix or a ceramic matrix. Auxiliary heaters are regularly formed by current-carrying metallic conductors, which are arranged upstream of the corresponding catalytic converters in the direction of flow of the exhaust gas.

A particular disadvantage of the devices in the prior art is that the implementation of electrical heating systems in conjunction with a ceramic catalyst matrix has so far been inadequate. In particular, the heating effect and durability of the known systems are not optimal.

SUMMARY OF THE INVENTION

The present invention therefore addresses the problem of creating a device for exhaust gas aftertreatment which has an electrical heating source and allows improved heating of the exhaust gas flow and/or the ceramic matrix. Furthermore, a method for producing such a device is created.

The problem relating to the device is solved by a device for the aftertreatment of exhaust gases from an emission source, in particular an internal combustion engine, with an exhaust tract through which an exhaust gas can flow, with at least one catalytic converter, the catalytic converter having a ceramic honeycomb body, which is provided with a catalytically active surface coating, and with an electrically heatable heater, the heater being formed by a metallic electrical conductor, the honeycomb body having a number of flow channels which can be flowed through from a gas inlet side to a gas outlet side, the conductor being integrated into the ceramic honeycomb body, it being arranged downstream of the gas inlet side and arranged upstream of the gas outlet side as viewed in the direction of flow.

Ceramic honeycomb bodies are widely known in the prior art and are produced for example by extruding, pressing or casting and then sintered. The honeycomb bodies have a plurality of flow channels, which can be flowed through along a main direction from the gas inlet side to the gas outlet side.

The metallic conductor can be formed for example by a metal wire. In addition to different diameters and cross sections, the material used may also be changed in order to produce a suitable resistance. The heating effect is produced by utilizing the ohmic resistance of the conductor by connecting the conductor to a voltage source outside the honeycomb body and applying a current thereto.

The arrangement downstream of the gas inlet side and upstream of the gas outlet side in the direction of flow is preferred, since the conductor is thus arranged inside the ceramic honeycomb body. The conductor is therefore in particular not arranged on or upstream of the gas inlet side.

It is particularly advantageous if the conductor is placed in clearances in the end face of the gas inlet side and/or the gas outlet side. Clearances may be produced for example by machining processes. For example, a groove may be milled into the end face of the gas inlet side of the honeycomb body, into which the conductor is inserted. In this case, the arrangement of the conductor is also determined by the course of the groove. Depending on the intended use, the metallic conductor may also be arranged on the gas outlet side, if for example the intention is to heat up downstream regions as viewed in the direction of flow.

It is also advantageous if the conductor is fixed in the ceramic honeycomb body by latching elements. In addition to the clearance or clearances, latching elements which fix the conductor in the honeycomb body may be provided. These may for example take the form of projections and latching lugs. Alternatively, clamping elements, which are for example inserted into individual flow channels and thereby fix the conductor, may also be provided.

A preferred exemplary aspect is characterized in that the ceramic honeycomb body is formed from at least two honeycomb bodies configured as disk elements, which are arranged one after the other in the direction of flow, each of the disk elements having an integrated conductor, with the conductors in the disk elements being electrically conductively connected to one another.

The entire honeycomb body can be formed from a plurality of disk elements, which have in each case a shorter axial extent than the entire honeycomb body. These disk elements preferably have an identical cell density and channel distribution. In alternative configurations, different cell densities and channel distributions may also be provided in the individual disk elements.

Each of the disk elements may have an electrical conductor which is arranged and fixed according to the principle described above in the disk element acting as a honeycomb body. The individual conductors may be connected to one another by suitable electrical connections to form a common conductor. In this way, a honeycomb body which, when viewed along its main direction of flow, has a heating conductor in a number of planes parallel to the gas inlet side is produced.

It is also preferable if a plurality of conductors are integrated in the honeycomb body.

The conductors may be arranged in a common plane or in different planes, which are preferably arranged parallel to the gas inlet side. The planes are preferably arranged offset from one another in the axial direction of the honeycomb body.

In addition, it is advantageous if the conductor is arranged in a plane parallel to the end face of the gas inlet side.

Furthermore, it is advantageous if the conductor is arranged both in a plane parallel to the end face of the gas inlet side and in a direction transverse to the end face. The conductor may therefore also run in the axial direction of the honeycomb body, that is to say transversely to the end face. Thus, for example, one conductor can be used for a number of planes.

It is also expedient if one or more conductors are arranged in a number of mutually parallel planes in the honeycomb body.

An exemplary embodiment of the invention relates to a method for producing a ceramic honeycomb body with a metallic electrical conductor, the following production steps being performed:
- producing a ceramic honeycomb body, for example by shaping, pressing or casting the ceramic powder or granulate,
- pressing the metallic conductor into the ceramic honeycomb body, and
- sintering the honeycomb body with the pressed-in metallic conductor.

The conductor is pressed in particular into the not yet sintered honeycomb body, which is referred to as a green compact. At this point in time, the ceramic does not yet have the strength that is produced after the sintering process. By pressing in the conductor and then sintering it, the conductor is held in the ceramic honeycomb body in a precisely fitting and durable manner. The conductor may for example be placed in the desired shape on the end face of the gas inlet side and then pressed flat into the honeycomb body.

An additional processing step may also be characterized by the preforming of an axial depression, a depression for inserting the metallic conductor in the ceramic honeycomb body being produced with the aid of suitable machining.

In addition, it is advantageous if the metallic conductor is pressed into the end face of the honeycomb body from its gas inlet side in the direction of the gas outlet side. In this way, the conductor for heating is at the start of the honeycomb body, as viewed in the direction of flow, as a result of which the flowing exhaust gas is essentially heated before it flows through the honeycomb body. This promotes faster heating of the exhaust gas.

Furthermore, it is expedient if the metallic conductor follows a defined course, it being arranged in particular in a spiral or meandering manner. In particular, it is advantageous if the conductor is arranged such that it is distributed as evenly as possible over the cross section of the honeycomb body in order to ensure that the exhaust gas is heated as homogeneously as possible.

An uneven distribution can for example result in improved heating in the case of a non-homogeneous flow through the honeycomb body. A non-homogeneous flow may be produced for example by deflections in the flow path of the exhaust gas, which can lead to uneven distributions of the exhaust gas concentration and furthermore to different flow velocities over the cross section of the honeycomb body.

It is also advantageous if a plurality of metallic conductors are pressed into the end face of the honeycomb body.

Advantageous developments of the present invention are described in the description of the figures that follows.

BRIEF DESCRIPTION OF THE DRAWINGS

The invention is explained in detail in the following text on the basis of exemplary embodiments with reference to the drawings, in which.

DETAILED DESCRIPTION OF THE PRESENTLY PREFERRED EMBODIMENTS

Figure 1:
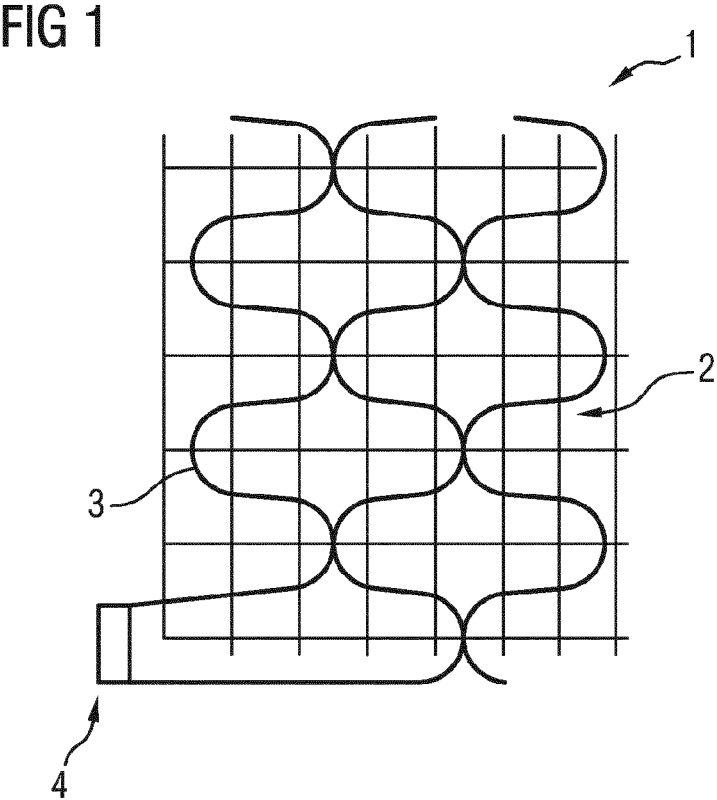
FIG. 1 shows a schematic view of the arrangement of a conductor on the end face of a honeycomb body.

FIG. 1 shows a plan view of the end face of a honeycomb body 1. The flow channels 2 can be seen, having a rectangular cross section in the example shown, and also a conductor 3, running in a wavy manner along the end face of the honeycomb body 1. Also shown is a contacting possibility 4, which is used for electrical contacting of the conductor 3.

It can be seen that the conductor 3 intersects the flow channels 2 and therefore covers a certain proportion of the flow cross section of the channels 2.

Figure 2:
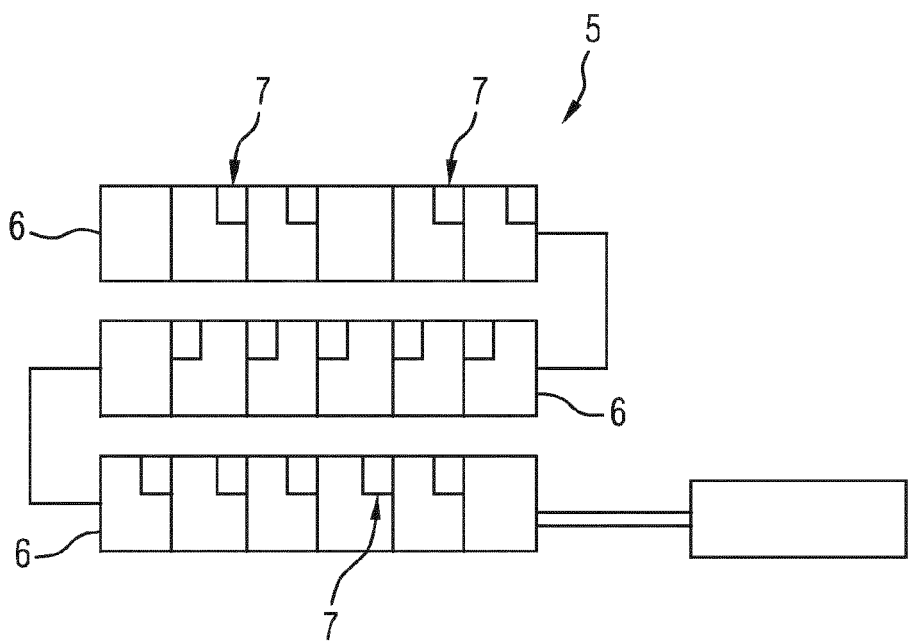
FIG. 2 shows a sectional view through a honeycomb body formed from a number of disk elements.

FIG. 2 shows a honeycomb body 5 formed from a number of disk elements 6. Each of the disk elements 6 has a conductor 7. The conductors 7 are electrically conductively connected between the disk elements 6. The conductors 7 therefore form a common conductor that extends through the entire honeycomb body 5. Stacking the disk elements 6 has the effect in practice of producing within the honeycomb body 5 a number of planes in which the flowing exhaust gas is heated.

Figure 3:
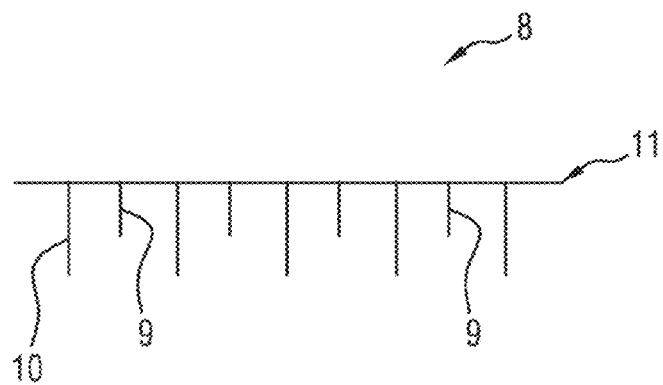
FIG. 3 shows a sectional view through a honeycomb body with a pressed-in conductor near the end face of the gas inlet side.

FIG. 3 shows a section through a honeycomb body 8. The walls 10 indicate the flow channels, which extend through the honeycomb body 8 from the gas inlet side 11. Reference number 9 designates the electrical conductor, which is arranged analogously to the conductor 3 shown in FIG. 1 such that it is distributed over the cross section of the honeycomb body 8. It can be seen in particular that the conductor 9 is arranged in the immediate vicinity of the end face 11 of the honeycomb body 8.

Figure 4:
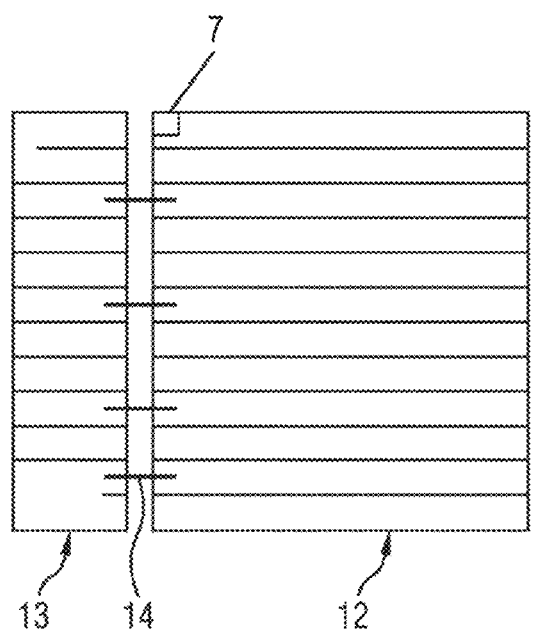
FIG. 4 shows a view of a ceramic honeycomb body with an upstream heating disk.

FIG. 4 shows a ceramic honeycomb body 12. Arranged upstream of this is a heating disk 13, which is connected to the honeycomb body 12 by connectors 14. The heating disk 13 is preferably also a ceramic honeycomb body, which has a conductor analogous to the previously described figures.

Figure 5:
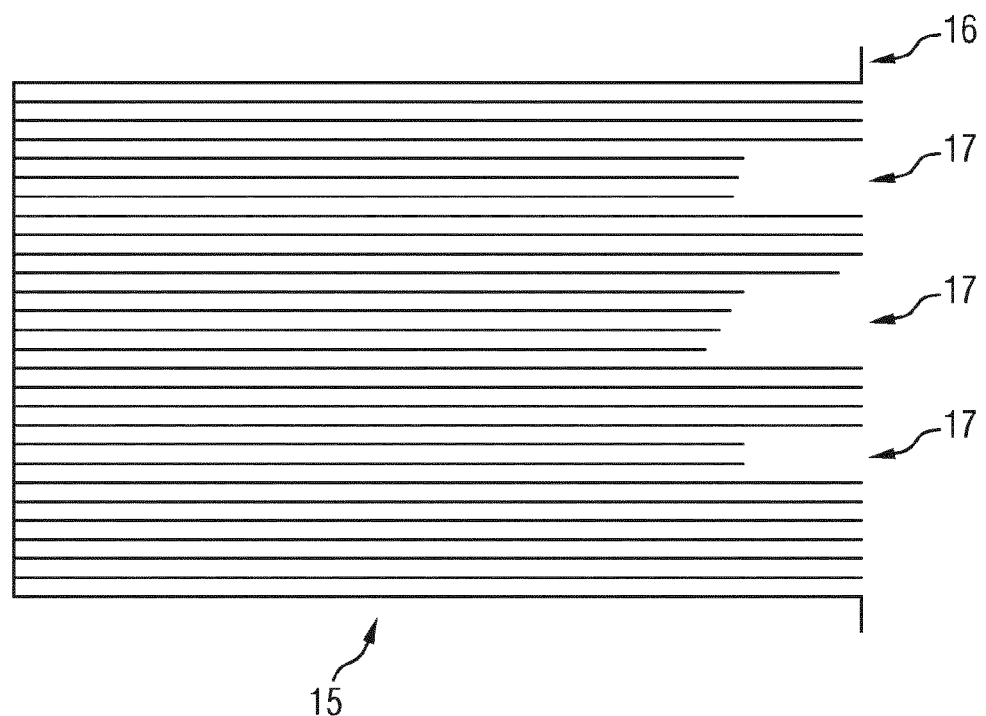
FIG. 5 shows a sectional view through a honeycomb body with a milled groove for receiving the conductor.

FIG. 5 shows a section through a honeycomb body 15. Shown on its gas inlet side 16 are clearances 17, which are introduced into the finished, that is to say sintered, honeycomb body. These can be introduced, for example, by a machining process. In a plan view of the gas inlet side 16, the individual clearances 17 can form a contiguous groove into which the conductor is inserted.

The exemplary embodiments of FIGS. 1 to 5 have in particular no limiting character and serve to illustrate the concept of the invention.

Although exemplary embodiments are explained in the above description, it should be noted that numerous modifications are possible. It should moreover be pointed out that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the integral parts described, without departing from the scope of protection as it is apparent from the claims and combinations of features equivalent thereto.

The invention claimed is:

1. A device for the aftertreatment of exhaust gases from an emission source, comprising
   an exhaust tract through which an exhaust gas can flow in a direction of flow, with at least one catalytic converter, the catalytic converter having:
      a ceramic honeycomb body (1, 5, 8, 12, 15) having:
         a catalytically active surface coating,
         an electrically heatable resistance heater (3, 7, 9), the heater (3, 7, 9) having a metallic electrical conductor (3, 7, 9),
         a plurality of flow channels which can be flowed through from a gas inlet side (11, 16) to a gas outlet side,
      wherein the conductor (3, 7, 9) is integrated in the ceramic honeycomb body (1, 5, 8, 12, 15) in which the exhaust gases flow, and is arranged downstream of the gas inlet side (11, 16) and upstream of the gas outlet side, as viewed in the direction of flow,
      wherein the conductor is arranged in a plurality of clearances (17) in the ceramic honeycomb body (1, 5, 8, 12, 15) in which the exhaust gases flow downstream of an upstream end face of the gas inlet side (16) and/or upstream of a downstream end face of the gas outlet side,
      wherein the conductor (3, 7, 9) is integrated in the plurality of clearances so that each portion of the conductor (3, 7, 9) in each of the clearances is circumferentially surrounded on a radial internal and a radial external side by the ceramic honeycomb body and in contact with the ceramic honeycomb body on an axial side, wherein the ceramic honeycomb body (5) is formed from at least two honeycomb bodies configured as disk elements (6), which are arranged one after the other in the direction of flow, each of the disk elements (6) having a plurality of clearances with an integrated conductor (7), with the conductors (7) in the disk elements forming a common conductor that extends axially through the honeycomb body.

2. The device as claimed in claim 1, wherein the conductor is fixed in the ceramic honeycomb body by means of latching elements.

3. The device as claimed in claim 1, wherein a plurality of conductors are integrated in the honeycomb body.

4. The device as claimed in claim 1, wherein the conductor (3, 7, 9) is arranged in a plane parallel to the end face of the gas inlet side (11, 16).

5. The device as claimed in claim 4, wherein the conductor is arranged both in a plane parallel to the end face of the gas inlet side and in a direction transverse to the end face.

6. The device as claimed in claim 1, wherein a plurality of conductors (7) are arranged in a plurality of mutually parallel planes in the honeycomb body (5).

7. A method for producing the device as claimed in claim 1, the method comprising:
   shaping, pressing or casting a ceramic powder or granulate to form a shape of the ceramic honeycomb body,
   pressing the metallic conductor into the formed ceramic honeycomb body, and
   sintering the honeycomb body having the pressed-in metallic conductor.

8. The method as claimed in claim 7, wherein the metallic conductor is pressed into an end face of the honeycomb body from a gas inlet side in the direction of the gas outlet side.

9. The method as claimed in claim 7, wherein the metallic conductor follows a defined course, the course being arranged in a spiral or meandering manner.

10. The method as claimed in claim 7, wherein a plurality of metallic conductors are pressed into the end face of the honeycomb body.

11. The device as claimed in claim 1, wherein the aftertreatment of emission source is an internal combustion engine.

12. The device as claimed in claim 1, wherein the heater (3, 7, 9) is entirely radially surrounded by the ceramic honeycomb body (1, 5, 8, 12, 15).

13. The device as claimed in claim 1, wherein the heater (3, 7, 9) is arranged entirely downstream of the gas inlet side (11, 16).

14. The device as claimed in claim 1, wherein the heater (3, 7, 9) is arranged in the ceramic honeycomb body (1, 5, 8, 12, 15).

* * * * *